Dec. 9, 1969   E. V. BURNS   3,482,548
CAT SCRATCHING DEVICE
Filed July 31, 1967   2 Sheets-Sheet 1

INVENTOR.
EDGAR V. BURNS
BY M. A. Hobbs
ATTORNEY

Dec. 9, 1969   E. V. BURNS   3,482,548
CAT SCRATCHING DEVICE
Filed July 31, 1967   2 Sheets-Sheet 2

INVENTOR.
EDGAR V. BURNS
BY
M. A. Hobbs
ATTORNEY

United States Patent Office 3,482,548
Patented Dec. 9, 1969

3,482,548
CAT SCRATCHING DEVICE
Edgar V. Burns, South Bend, Ind., assignor to Lowe's Inc., Cassopolis, Mich., a corporation of Michigan
Filed July 31, 1967, Ser. No. 657,262
Int. Cl. A01k 29/00
U.S. Cl. 119—29                                    6 Claims

ABSTRACT OF THE DISCLOSURE

A cat scratching device consisting of an elongated flat base and an arcuate member attached at its ends to the base and having a fibrous-like material on the surface thereof for cats and kittens to paw. The arcuate member may be assembled and disassembled readily from the base and, when disassembled, assumes a flat shape.

---

In order to provide house cats and kittens with a means of exercising their paws, often referred to as sharpening their claws, a post constructed of relatively rigid material, but sufficiently soft that the claws will easily penetrate, is made available to them, usually by placing the post on the floor and supporting it firmly in an upright position. The supporting structure and post must be sufficiently strong to support the force exerted thereon while the cat or kitten is clawing the post. These posts, which are often constructed of a fibrous material, are often unsightly, or are rendered so by the clawing and tearing of the exposed structure by the cats or kittens. Further, as the cat or kitten claws the post, pieces of the fibrous material are usually torn therefrom, littering the floor around the post. Hence, these posts must be replaced at relatively short intervals, depending on how vigorously and frequently the cat or kitten uses the post. It is therefore one of the principal objects of the present invention to provide a cat scratching post or structure which is attractive in appearance and which can be used effectively by the cat without any separate supporting structure apart from the floor.

The aforementioned conventional scratching posts are frequently bulky and are relatively large for counter or peg-board displays, and consequently they often are not displayed to the best advantage for effective sales promotion, and the bulkiness often makes the shipping expense excessively high for the nature and price of the product. It is therefore another object of the present invention to provide a scratching post which can be shipped and displayed in a folded or disassembled condition and readily assembled into the final shape where it is to be used, and which can be used over an extended period of time without shedding or otherwise causing litter when used by the cat.

Still another object of the invention is to provide a relatively simple, easily fabricated scratching post of the aforementioned type which can easily be assembled and disassembled, but which will form a firm, elevated support for the scratching material so that the cat or kitten can use the post at any convenient place away from walls, furniture or other similar supporting structure.

Further objects and advantages of the invention will become apparent from the following description and accompanying drawings, wherein.

Referring more specifically to the drawings, numeral 10 indicates generally the present cat scratching post or device, showing it in the position and condition normally assumed when it is available for use by a cat, with the lower or bottom surface lying flat on the floor.

Figure 1:
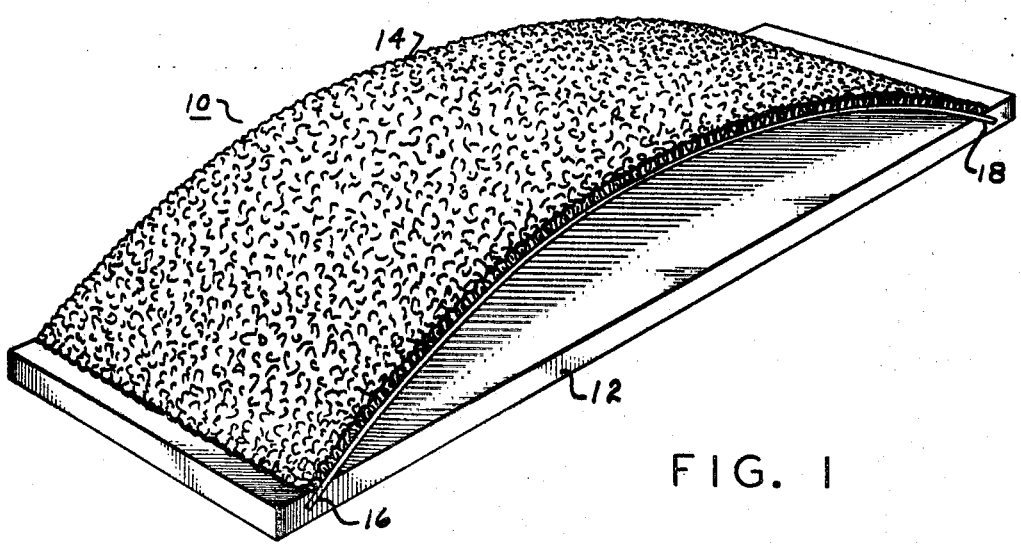
FIGURE 1 is a perspective view of the present cat scratching post, showing it in its assembled condition.
Figure 6:
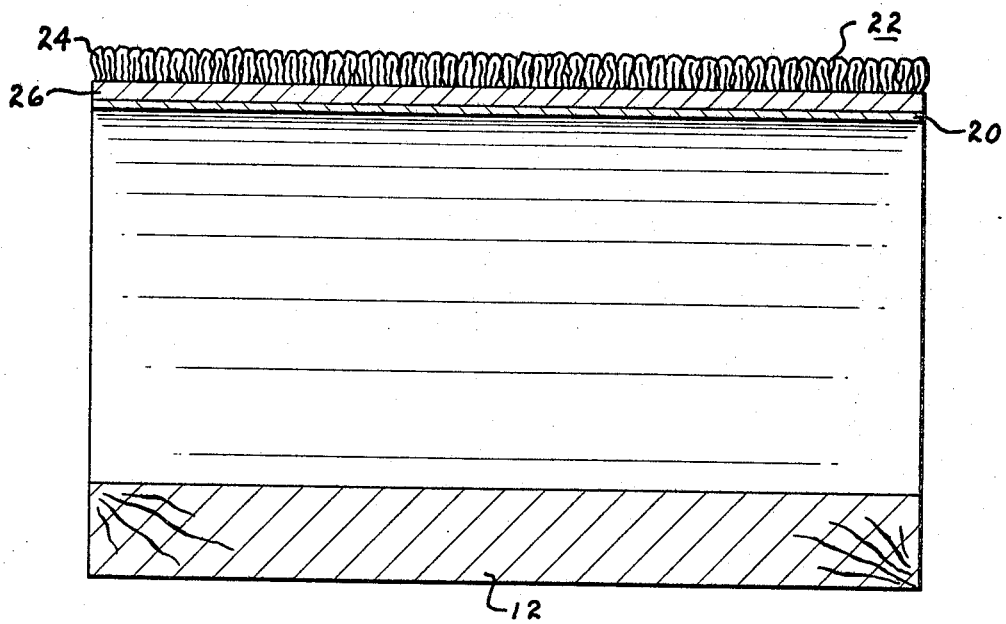
FIGURE 6 is an enlarged vertical cross sectional view of the scratching post, the section being taken on line 6—6 of FIGURE 3.
Figure 2:
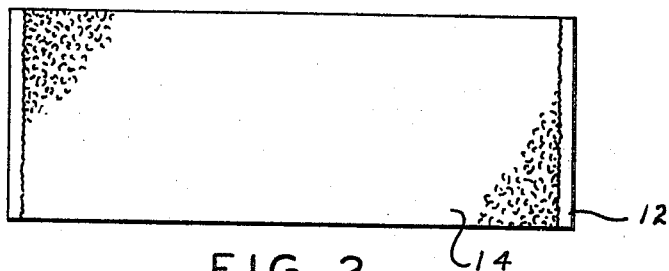
FIGURE 2 is a top plan view of the scratching post shown in FIGURE 1.
Figure 3:
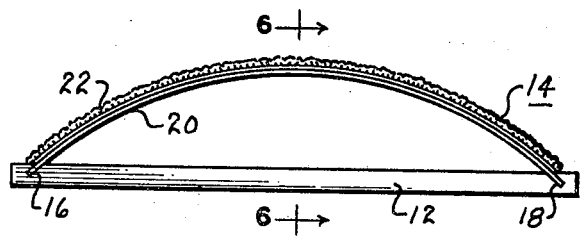
FIGURE 3 is a side elevational view.
Figure 4:
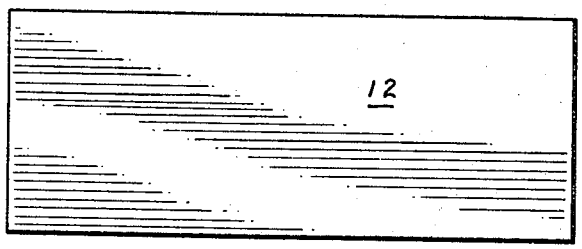
FIGURE 4 is a bottom view.

The scratching device or post consists of a base 12 and a scratching member 14 of a convex shape releasably mounted on base 12, the base preferably being substantially flat and constructed of any suitable material, such as wood or plastic. Two angularly positioned slots 16 and 18 are provided near the ends of the base for receiving the ends of scratching member 14 when it is in its assembled position, the two slots 16 and 18 preferably extending completely across the base. The scratching member consists of a flexible backing board 20 of plastic or composition material having sufficient yieldability to flex from the flat position shown in FIGURE 7 to the arcuate position shown in FIGURES 1 and 3. A fibrous material 22 is secured to the upper external surface of board 20, the material shown in the drawings consisting of the looped fabric-type of material 24 secured to woven base 26, which in turn is cemented or otherwise secured to the upper surface of board 20. The woven base material 26 covers the entire surface of member 20 with the exception of the marginal areas 28 and 30 at the two ends of the board, these two exposed ends of board 20 being adapted to slip into and seat in slots 16 and 18 when the scratching member is assembled in the manner illustrated in FIGURE 1. Carpeting has been found satisfactory for the scratching material, and pressboard or the like has been found suitable for board 20, since it is sufficiently stiff to support the scratching material when it is in the arcuate shape shown in FIGURES 1 and 3 and is sufficiently resilient to return to its flat condition shown in FIGURE 7 when removed from the slots of base 12.

Figure 7:
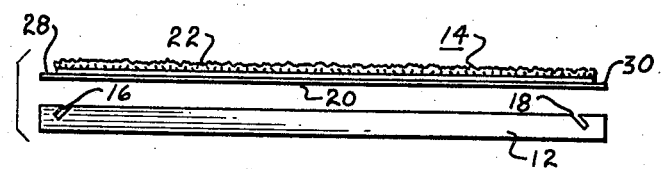
FIGURE 7 is a side elevational view of the principal parts of the present cat scratching post, showing the parts disassembled for packaging, shipping and storing.
Figure 5:
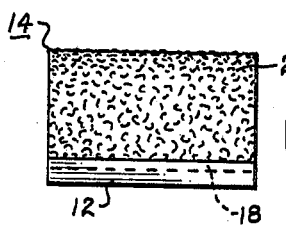
FIGURE 5 is a view of the end opposite the end shown in FIGURE 1.

In the fabrication of the present scratching post, the base and scratching member 12 and 14 are formed in the manner and shape illustrated in FIGURE 7, with the scratching member in its flat condition. The base and member are then packaged, shipped, displayed and sold in the flat and hence compact condition. When the post is to be used, the scratching member is mounted on the base by flexing it into the arcuate shape and slipping the two exposed ends 28 and 30 into slots 16 and 18, which hold the member in its arcuate or arch-shaped position. When the assembled post is placed on the floor, the cat or kitten can conveniently claw the material 24 in view of the arcuate, elevated position of the scratching member 14. If desired, one end of the post may be elevated and on a suitable support to give a generally vertical position to scratching member 14; however, normally the device is used with the base horizontal and resting on the floor.

The device is normally retained in its assembled condition as seen in FIGURE 11 so that it will be available at all times for the cat or kitten to exercise or sharpen its claws. In the event the device is not to be used, it can readily be disassembled into its flattened condition as shown in FIGURE 7 by merely slipping the two ends 28 and 30 from the two slots 16 and 18, thereby permitting the backing member 20 to return to its flat shape.

One of the advantages of the present scratching post is the fact that no additional support is required for holding the surface of scratching member 14 in raised position, thus permitting the device to be used in any convenient location in the home. Another advantage of the post is the interchangeability of scratching members to obtain desired color schemes which agree with the decor of the room in which the post is placed. Further, as the scratching material 24 is ultimately damaged or destroyed by the cat or kitten, the scratching member 14 can be replaced on the original base 12.

While the scratching member has been shown in one particular curvature, it can be constructed of greater or lesser curvatures and the device may be made in different widths and lengths without departing from the scope of the invention. Various other changes may be made to satisfy requirements.

I claim:

1. A cat scratching device comprising a substantially flat base, a member of convex shape mounted on said base consisting of a resilient yieldable backing board held in an arcuate shape on said base, and scratching material on the external surface of said convex member.

2. A cat scratching device as defined in claim 1 in which the opposite ends of said backing board are seated in slots in opposite ends of said base for securing said convex member to said base and holding said member in an arcuate position.

3. A cat scratching device as defined in claim 1 in which said scratching material on the external surface of said convex member is of a fibrous material.

4. A cat scratching device as defined in claim 3 in which said fibrous material includes a nap of a looped configuration projecting outwardly from said convex member.

5. A cat scratching device as defined in claim 1 in which said base and convex member are elongated and the convex member is connected to said base near the ends thereof to hold said convex member in an arcuate position when the device is assembled.

6. A cat scratching device as defined in claim 2 in which a convex member is releasably held by said slots.

References Cited

UNITED STATES PATENTS

| | | | |
|---|---|---|---|
| 2,894,487 | 7/1959 | Goldson | 119—1 |
| 2,997,019 | 8/1961 | Bryson | 119—1 |
| 3,159,141 | 12/1964 | Paterek | 119—29 |

HUGH R. CHAMBLEE, Primary Examiner

U.S. Cl. X.R.

119—1